UNITED STATES PATENT OFFICE.

WILLIAM J. BURNS, OF GEORGETOWN, KENTUCKY.

IMPROVEMENT IN THE MANUFACTURE OF CANDY.

Specification forming part of Letters Patent No. 123,149, dated January 30, 1872.

Specification describing certain Improvements in Candy, invented by WILLIAM J. BURNS, of Georgetown, in the county of Scott and State of Kentucky.

My invention has for its object to furnish a new and improved candy, which shall be pure and simple in composition, and beautiful and inviting in appearance; and it consists of the candy prepared of the ingredients in the proportions and manner hereinafter more fully described.

In making my improved candy take ten pounds of brown sugar and one ounce of cream of tartar, with sufficient water to make a syrup. Boil this solution and skim well, and then boil to a bale. At this stage add one-half of a gallon of molasses, little by little, to prevent boiling over, and again boil down to a bale. At this point have ready two pounds of butter, clarified as follows: Boil the butter and skim off all impurities that may rise to the top; strain it to free it from all particles of undissolved salt; let it stand and cool from five to ten minutes, and then pour it into the candy; then boil the candy to a crack and pour it upon marble to cool. When cold enough to work cut off about one-fourth of it for striping and stripe it in the ordinary way; then pull the balance white on the hook, put the stripe upon its top, and pull out both upon marble; cut it in the middle and double it with the white next the stripe; then pull out again and cut and double it in the manner before described until it is striped as desired. In this way the white will be upon both sides and the stripes will all be on the inside. Then lay it, from half an inch to an inch in thickness, upon a large pan, well greased, and cut and mark sizes with a knife, or break it when cold with a small hammer.

Having thus described my invention, I claim as new and desire to secure by Letters Patent—

1. An improved candy, made of the ingredients in the proportions herein set forth.
2. An improved striped candy, so made that the stripes may be all inside, substantially as herein shown and described.
3. The process herein set forth and described for making striped candy.

W. J. BURNS.

Witnesses:
  N. A. GLASS,
  E. B. KELLY.